United States Patent
Ogiso et al.

[15] 3,699,858
[45] Oct. 24, 1972

[54] CAMERA EQUIPPED WITH AUTO-FLASH DEVICE

[72] Inventors: Mitsutoshi Ogiso, Kawasaki-shi; Shohei Ohtaki, Tokyo, both of Japan

[73] Assignee: Canon Kabushiki Kaisha, Tokyo, Japan

[22] Filed: Nov. 4, 1969

[21] Appl. No.: 873,998

[52] U.S. Cl............95/10 CD, 95/10 CT, 95/11.5 R, 95/64 R
[51] Int. Cl............................G03b 7/08, G03b 15/03
[58] Field of Search .....95/10 C, 64 R, 10 CE, 10 CT

[56] References Cited

UNITED STATES PATENTS

| | | |
|---|---|---|
| 3,362,309 | 1/1968 | Cooper, Jr. et al.............95/10 |
| 3,526,177 | 9/1970 | Kiper et al.....................95/10 |
| 3,543,658 | 12/1970 | Reimann.......................95/10 |
| 3,397,629 | 8/1968 | Mori et al. ..................95/10 C |
| 3,487,757 | 7/1970 | Kiper..........................95/10 C |
| 3,535,989 | 10/1970 | Kitai..........................95/10 C |
| 3,535,991 | 10/1970 | Kitai..........................95/10 C |

*Primary Examiner*—Samuel S. Mathews
*Assistant Examiner*—Michael L. Gellner
*Attorney*—Ward, McElhannon, Brooks & Fitzpatrick

[57] ABSTRACT

An electronic shutter system for cameras having a shutter speed which is set to a constant value by automatically switching a photoconductor element of the time setting element of the electronic shutter to a predetermined and constant resistor for flash photographing. An electromagnet is provided which is activated when the brightness of a subject to be photographed is below the lowest limit of the EE working range of the electronic shutter in order to operate said switching. A main switch in a flash illuminating circuit is automatically closed by the electromagnet.

5 Claims, 3 Drawing Figures

CAMERA EQUIPPED WITH AUTO-FLASH DEVICE

This invention relates to a camera provided with flash-auto device.

It has hitherto been the practice that the under-exposure warning signal is displayed in the finder when the brightness of an object is too low to be within the EE working range of the electronic shutter.

This invention is to offer, by advancing one step farther, a camera with the so-called Flash-Auto equipment, in which the shutter speed of the electronic shutter is automatically switched to a specified speed for flash photography and the diaphragm is automatically set depending on the camera-to-object distance when the brightness of the object is dark and outside the EE working range.

An object of this invention is to offer a camera provided with an electronic shutter and flash-auto equipment which are so composed that, when the brightness of an object is outside the EE working range of the electronic shutter and on the low brightness side, a magnet is activated to switch the photoconductive element, acting to set the exposure time of the electronic shutter automatically, to a resistor having a specified resistance to make the shutter speed constant and, at the same time, the main switch of the flash circuit is closed to get the flash equipment ready for flashing.

The second object of this invention is to make an arrangement for displaying that said camera is unable to perform EE operation by inserting a warning lamp into the exciting circuit of the magnet which operates when the brightness of the object is on the low brightness side.

The third object of this invention is to automatic link the switching from the electronic shutter to the flash-auto equipment by closing a switch of the tightening release magnet of the diaphragm blade driving ring and, then by closing another switch of the circuit to release the tightening of the diaphragm blade driving ring to close down the diaphragm blades.

The fourth object of this invention is to improve further the said third object by providing a stopper for the diaphragm blade driving ring on the distance ring or on the parts interlocking with said distance ring, to determine the amount of the rotation of said ring 15 when closing the diaphragm blades to determine the aperture automatically corresponding to the camera-to-object distance.

The fifth object of this invention is to enable this invention to be applied to the lens shutter in which the shutter blades work also as the diaphragm blades, and more concretely, to automate the interlocked switching from electronic shutter to flash-auto by moving the stopper, which is moved in linking with the ASA setting ring and distance ring, as the sum of the ASA value and the distance, by closing the switch by the magnet that operates when the brightness of the object is low, by closing another switch to operate another magnet to release the tension of the diaphragm ring and to rotate said diaphragm ring until it hits the stopper, and by determining the amount of rotation of the blade driving ring, which has been released from tension by the shutter blade opening magnet, by the stopper provided on the ring.

This invention is applicable to various kinds of flash-auto equipment and, when the flash equipment is ready for shooting, the electronic shutter works at a constant speed, and the flash equipment is in disengaged state while the EE is at work. Since the switching between EE operation and flash operation is automated, the troublesome manual switching becomes unnecessary and accordingly there is no fear of losing the chance for snapshot, and as a result the camera can be used very effectively.

The present invention will be more apparent from the following description referring to an embodiment shown in the attached drawing, in which.

This invention will be described more in detail referring to an example shown in the attached drawings.

Figure 1:
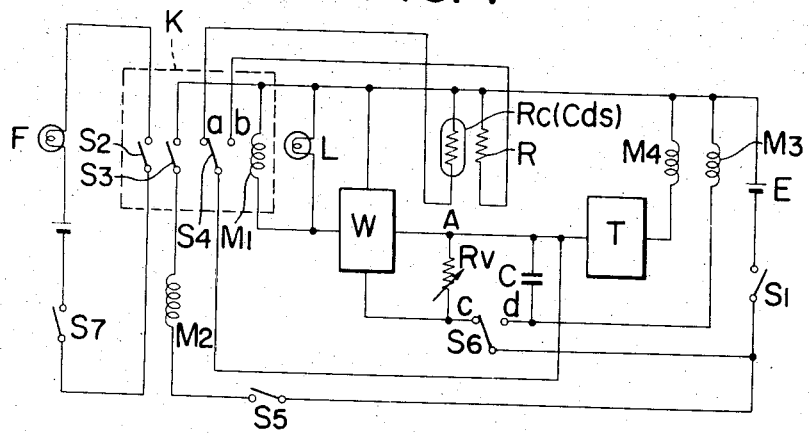
FIG. 1 shows the electrical circuit representing the basic construction of this invention.

In the circuit diagram of FIG. 1, switches $S_1$ through $S_3$, $S_5$ and $S_7$ are all turned off, and $S_4$ and $S_6$ fall into the states as shown by $a$ and $c$, respectively, when the shutter is charged.

When the shutter button is depressed, $S_1$ is turned on and the circuit comprising power source $E - Rc - (S_4 - a) - $ point $A - Rv - (S_6 - c) - S_1 - E$ is closed and a divided voltage is produced at point A caused by the interaction between the ASA film speed indicating resistance RV and the resistance Rc of the photoconductor CdS which corresponds to the brightness of the object and, when the potential of point A is lower than the set value determined for the warning circuit W (in other words, when the brightness of the object is low), the warning circuit W starts operation and turns on the lamp L to warn the photographer against under exposure.

When the warning lamp is not lit, press the shutter button farther. Then the switch $S_6$ is set to $d$, and the shutter blade opening magnet $M_3$ operates. Simultaneously a signal is sent to the time control circuit T by Rc and the capacitor C. The time control circuit T counts the control time and operates the shutter blade closing magnet $M_4$.

The above-mentioned exposure warning circuit W and time control circuit T comprise transistorized schmidt trigger circuit, differential circuit, bridge circuit, etc. which are turned on by the signals produced by the interaction between Rc and Rv and between Rc and C.

When the above-mentioned warning lamp L is lit, the main switch $S_2$ of the flash F is closed, the switch $S_4$ is changed over to $b$, and the switch $S_3$ is also closed by the action of the magnet $M_1$ contained in the relay K which is arranged in parallel with the warning lamp L. Since the switch $S_4$ is set at $b$, the fixed resistor R is connected to the capacitor C in place of Rc (CdS), and the time is always controlled to be fixed by R and C. When the shutter button is continuously depressed, the switch $S_5$ is turned on, the magnet $M_2$ is made to operate to release the tightening 17 of the diaphragm blade ring 15 of FIG. 2, and the ring 15 is rotated clockwise to stop down the diaphragm blade 21.

When the shutter button is farther depressed, the switch $S_6$ is changed over from $c$ to $d$, the opening magnet $M_3$ operates to release the tightening 8 of the shutter blade driving ring 1, and the ring 1 is rotated clockwise to open the shutter blade 11.

Simultaneously with the changing over of the switch $S_6$ from $c$ to $d$, the time controlling circuit T counts the time at the time constant set by R and C, and, if the synchro contact $S_7$ is made previously to work when the shutter blade 1 is full open, the said contact $S_7$ works as the synchronous contact switch for flash photographing.

Figure 2:
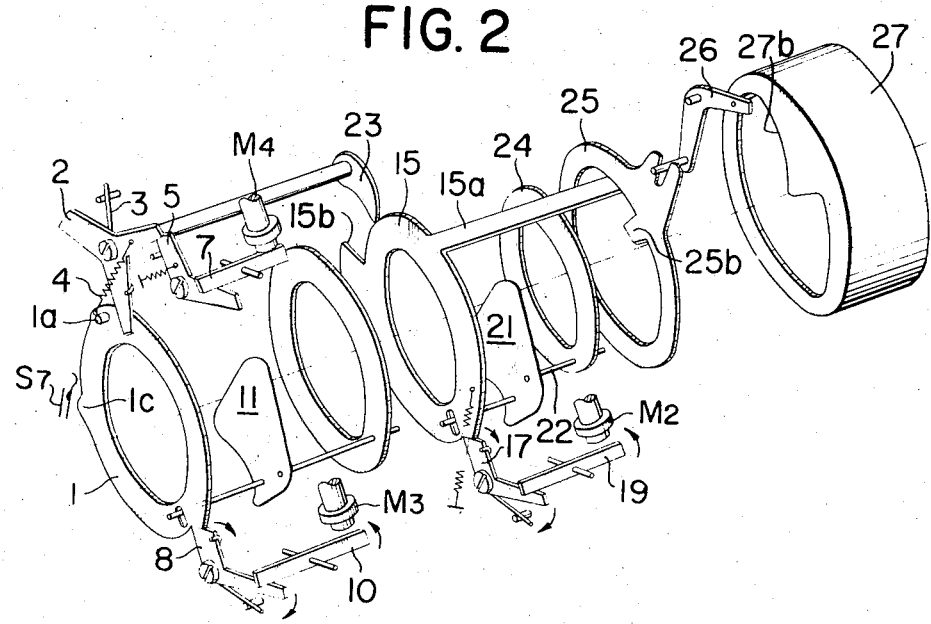
FIG. 2 shows the magnified, exploded, perspective view of the shutter mechanism in the case when this invention is applied to the lens shutter having the shutter blades and diaphragm blades.

FIG. 2 illustrates the mechanism responsible for the above-mentioned operation, and operations are performed in the following sequence when the camera is ready for EE shooting. The opening spring 4 and the closing spring 3 of the shutter blade 11 are energized by rotating the shutter charging lever 2 until it hooks the tightening part 5 and halts. The shutter blade driving ring 1 is pulled by the spring 4 and rotated until it hooks the tightening part 8 and halts to close the shutter blade 11. The diaphragm blade 21 is at the full open position because its driving ring 15 hooks the tightening part 17 and halts. The distance is set by the distance ring 27.

As was already described in the circuit of FIG. 1, when the shutter blade opening magnet $M_3$ operates, one end of the lever 10 is attracted to hit the part 8, and the ring 1 is released of tightening, rotated in the direction of arrow by the action of the spring 4 and then opens the blade 11.

After a period of time determined by Rc, C, and time controlling circuit T, the shutter blade closing magnet $M_4$ attracts one end of the lever 7, hits the part 5, and releases the tightening of the lever 2. Therefore the lever 2 is closed and rotated clockwise by the action of the spring 3, and pushes the shutter blade driving ring 1 in the direction opposite to the arrow by way of the pin $1_a$ and closes the blade 11.

In EE operation, the film speed (ASA) is set by varying the diaphragm located in front of CdS.

The ring 25 is so arranged that its rise 25b has a sufficient space between it and the arm 15a to avoid collision which otherwise may occur when the distance ring 27 is rotated full within the range and that the arm 15a hits 25b only when the ring 15 is rotated.

The auto-flash shooting when the brightness of an object is outside the EE shooting range is carried out as follows;

The magnet $M_1$ contained in the relay K operates and, since the switch $S_3$ is on, the magnet $M_2$ operates when the switch $S_5$ is turned on by the depression of the release button, and attracts one end of the lever 19, lets the other end hit the tightening lever 17 to release it from tightening. Therefore, the ring 15 is rotated in the direction of arrow to stop down the diaphragm blade 21.

The aperture is automatically set depending on the distance setting in such a way that when the distance ring 27 is set at the camera-to-object distance, the ring 25, which links with the cam 27b by way of the lever 26, is rotated and the position of its rise 25b is determined by the distance, and, the diaphragm blade driving ring 15 is rotated until the arm 15a of the ring 15 hits 25b.

The opening and closing of the shutter blade 11 by the action of the magnets $M_3$ and $M_4$ follows the same procedure as EE shooting. However, the fixed resistor R works in place of CdS to open the shutter blade 11 to the full in fixed period of time, and the same time, close the synchronous contact switch $S_7$ to fire the flash F.

When the charge lever 2 rotates clockwise to close the shutter blade 11 as described in the paragraph for EE shooting, the lever 23 which is mounted on the common bar with said lever 2 also rotates to rotate the diaphragm driving ring 15 in the direction opposite to the arrow by way of the projection 15b until the ring 15 hooks the tightening part 17. As a result, the diaphragm blade 21 is maintained at full open position.

Moreover, it is possible to introduce the ASA signal into the relationship between the aperture and distance by shifting the position of the rotary shaft 22 of the diaphragm blade 21 by rotating the ASA ring 24.

Figure 3:
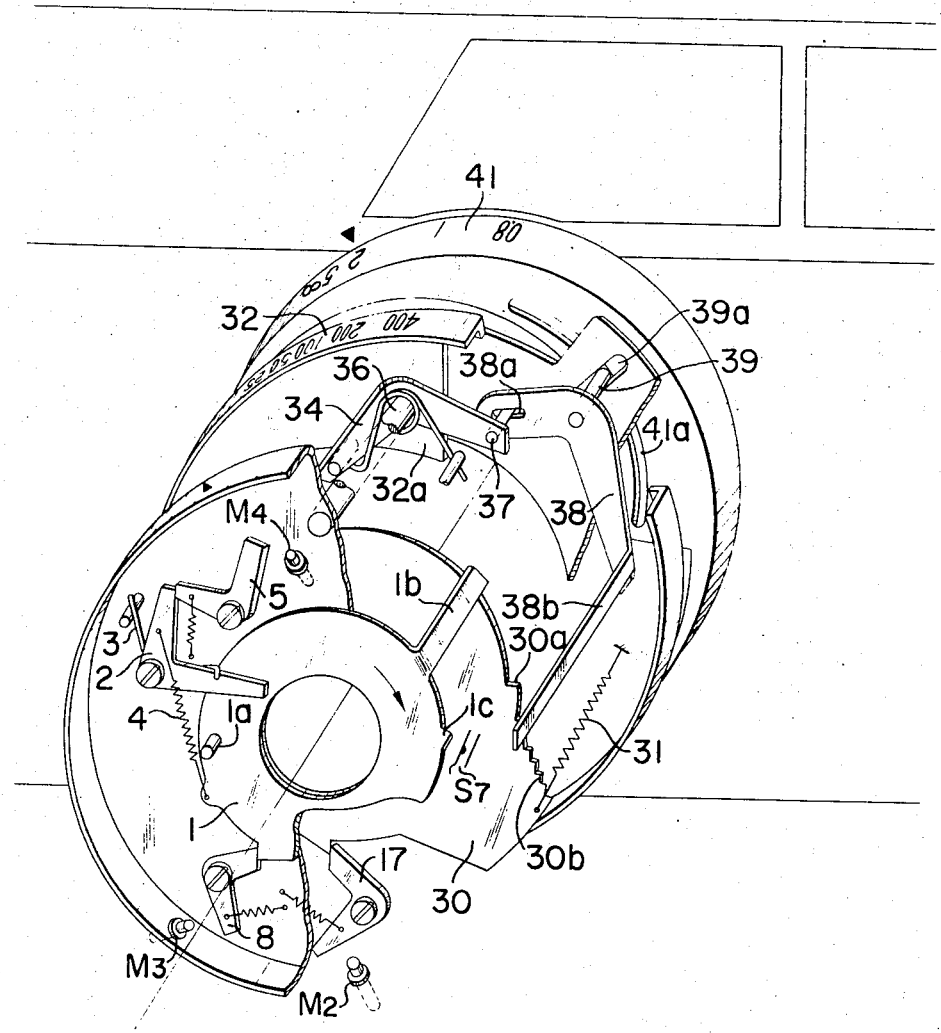
FIG. 3 shows the magnified perspective view of the shutter mechanism in the case when this invention is applied to a shutter in which one set of blades work as the above-mentioned two sets of blades.

FIG. 3 shows the case in which this invention is applied to the lens shutter where the shutter blade is also used as the diaphragm blade. First, focusing and the relationship between ASA speed and the shutter blade will be described. When the ASA setting ring 32 is rotated, its cam surface 32a forces the lever 34 to rotate around the shaft 36.

When the distance ring 41 is rotated, the pin 39 that engages the cam 41a goes in or out along the fixed guide groove 39a. Since the elongated hole 38a of the lever 38 on which the pin 39 is planted engages the pin 37 of the lever 34 that moves with the change in ASA setting, the lever 38 rotates around the pin 37 and the distance between the projection 38b on one end of the lever 38 and the step cam 30b varies with the rotation. The step cam 30b is installed on the diaphragm controlling ring 30.

In the case of EE shooting, the magnet $M_3$ releases the tightening of the tightening part 8. The blade driving ring 1 is rotated clockwise (as indicated by arrow) by the action of the opening spring 4 to open the blade.

After a period of time counted by the time controlling circuit T, the magnet $M_4$ operates to release the tightening part 5. The lever 2 rotates the ring 1 counterclockwise and closes the blade by the action of the closing spring 3. In other words, the half-open type shutter operation is performed. During the period of EE shooting, the diaphragm located in front of CdS is changed linking with the ASA ring 32 (not shown).

The stopper 30a on Flash-Auto mechanism 30 is placed at a position sufficiently apart from the movable range of the projection 1b so that the projection 1b will never touch 30a even when the Flash-Auto mechanism 30, 30a, 30b, 1a, and 1b is full opened.

When the brightness of an object is outside the EE shooting range, the magnet $M_2$ operates first to release the tightening part 17 as described before referring to the circuit diagram. Then the diaphragm controlling ring 30 is rotated counterclockwise by the action of spring 31 until its step cam 30b hits the projection 38b. In other words the position of the rotation center of the blade precedes.

Next, the blade opening magnet $M_3$ operates, and the driving ring 1 rotates until its projection 1b hits the stopper 30a of the ring 30 and opens the blade. During this while, the synchro contact $S_7$ is closed by the projection 1c and the flash is fired. After a fixed period of time which is determined by R and C, the blade is closed by the action of the magnet 4. The aperture of the diaphragm varies with the position where the above-mentioned 1b and 30a meet, and the aperture is adjusted corresponding to the distance and ASA settings.

The restoration of the diaphragm adjusting ring 30 may be attained at the same time the shutter is charged or by the spring 3 at time of closing the ring 1. A lever (not shown) mounted on the common bar with the charge lever 2 assists the restoration of the ring 30 as is shown in FIG. 2.

The feature of this invention lies in the fact that the EE linking camera is further advanced to the flash camera, in which, by utilizing the electric shutter circuit containing an under-exposure warning circuit, the EE circuit is automatically switched to the flash circuit upon closure of said warning circuit, and flash shooting is performed by the electric shutter the distance and the diaphragm being interlocked to each other under condition that exposure is specified as Bulb.

What is claimed is:

1. A camera provided with a flash auto system having an electronic shutter including a time setting element having a photoconductive element, a resistor having a specified resistance, a magnet, means for setting the shutter speed at a specified speed by switching automatically from the photoconductive element of the time setting element of the electronic shutter to said resistor by the action of said magnet which operates when the brightness of an object to be photographed is lower than a preselected lower limit, a flash circuit having a main switch, and means for simultaneously closing the main switch of the flash circuit to make the flash circuit ready for flashing, diaphragm blades, a diaphragm blade driving ring, a diaphragm blade driving ring control circuit including a tension release magnet and a first switch and a second switch, said diaphragm blades being closed down by closing said switches, closure of said first switch being effected by said magnet which operates when the brightness of an object to be photographed is lower than a preselected lower limit, and closure of said second switch of the circuit releases the tension of the diaphragm blade driving ring.

2. A camera provided with a flash auto system having an electronic shutter including a time setting element having a photoconductive element, a resistor having a specified resistance, a magnet, means for setting the shutter speed at a specified speed by switching automatically from the photoconductive element of the time setting element of the electronic shutter to said resistor by the action of said magnet which operates when the brightness of an object to be photographed is lower than a preselected lower limit, a flash circuit having a main switch, and means for simultaneously closing the main switch of the flash circuit to make the flash circuit ready for flashing, a warning lamp in the activating circuit of the magnet, said warning lamp operating when the brightness of an object is lower than said preselected lower limit, a diaphragm blade, a diaphragm blade driving ring, a distance ring, stopper means for limiting the movement of said diaphragm blade driving ring, means interconnecting said distance ring with said stopper means for adjusting the position of the stopper means, an aperture being automatically determined corresponding to the distance when closing down the diaphragm blade by said stopper means, a diaphragm blade driving ring control circuit for releasing the tension of the diaphragm blade driving ring to thereby close down the diaphragm blade.

3. A camera provided with a flash auto system having an electronic shutter including a time setting element having a photoconductive element, a resistor having a specified resistance, a shutter blade opening magnet, means for setting the shutter speed at a specified speed by switching automatically from the photoconductive element of the time setting element of the electronic shutter to said resistor by the action of said magnet which operates when the brightness of an object to be photographed is lower than a preselected lower limit, a flash circuit having a main switch, and means for simultaneously closing the main switch of the flash circuit to make the flash circuit ready for flashing, a lens shutter having shutter blades confunctioning as diaphragm blades, a blade driving ring for opening and closing said shutter blades to make an exposure, a diaphragm ring, a stopper for limiting the rotational travel of said diaphragm ring to determine the aperture, an ASA setting ring and a camera-to-object distance ring, means coacting with said ASA ring and said distance ring to position said stopper corresponding to their respective settings, a diaphragm ring control circuit, a magnetically operated switch in said control circuit closable when the brightness is lower than said preselected lower limit, a second magnet in said control circuit when activated releases the tension of said diaphragm ring so that it rotates until it engages said stopper, and a second successively closable switch in said control circuit for closing said control circuit.

4. An electronic shutter system for cameras comprising means for automatically determining the time constant needed for flash photographing including an electric circuit for switching from a photoconductor to a predetermined and constant resistor when the brightness of a subject to be photographed is below a preselected lower limit, a flash illuminating circuit, a main switch in said flash illuminating circuit, means in said electric circuit for automatically closing said main switch when the brightness is below said preselected lower limit.

5. An electronic shutter system for cameras, means for automatically determining the time constant needed for flash photographing including an electric circuit for switching from a photoconductor to a predetermined and constant resistor when the brightness of a subject to be photographed is below a preselected lower limit, a lamp for indicating flash photographing, an electromagnet in said electric circuit for lighting said lamp when the brightness is below said preselected limit, a flash illuminating circuit, a main switch in said flash illuminating circuit, said electromagnet automatically closing said main switch when the brightness is below said preselected limit.

* * * * *